United States Patent
Park et al.

(10) Patent No.: US 9,949,214 B2
(45) Date of Patent: Apr. 17, 2018

(54) METHOD FOR REPORTING BUFFER STATUS AND COMMUNICATION DEVICE THEREOF

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 14/651,157

(22) PCT Filed: Jan. 9, 2014

(86) PCT No.: PCT/KR2014/000222
§ 371 (c)(1),
(2) Date: Jun. 10, 2015

(87) PCT Pub. No.: WO2014/109558
PCT Pub. Date: Jul. 17, 2014

(65) Prior Publication Data
US 2015/0327115 A1    Nov. 12, 2015

Related U.S. Application Data

(60) Provisional application No. 61/751,282, filed on Jan. 11, 2013, provisional application No. 61/807,338, filed on Apr. 2, 2013.

(51) Int. Cl.
H04W 4/00 (2009.01)
H04B 7/216 (2006.01)
(Continued)

(52) U.S. Cl.
CPC ......... *H04W 52/365* (2013.01); *H04L 1/1887* (2013.01); *H04L 61/2092* (2013.01);
(Continued)

(58) Field of Classification Search
CPC ............... H04W 52/365; H04W 80/02; H04W 72/0426; H04W 74/0833; H04W 28/0278;
(Continued)

(56) References Cited

U.S. PATENT DOCUMENTS

2009/0125650 A1    5/2009 Sebire
2009/0175229 A1    7/2009 Tseng
(Continued)

FOREIGN PATENT DOCUMENTS

CN    101841844 A    9/2010
CN    102123512 A    7/2011
(Continued)

OTHER PUBLICATIONS

Ishii et al., "A Novel Architecture for LTE-B: C-plane/U-plane Split and Phantom Cell Concept," GC' 12 Workshop: International Workshop on Emerging Technologies for LTE-Advanced and Beyond-4G, Dec. 3, 2012, pp. 624-630, XP032341446.
(Continued)

*Primary Examiner* — Kiet Tang
(74) *Attorney, Agent, or Firm* — Birch, Stewart, Kolasch & Birch, LLP

(57) ABSTRACT

There is provided a method for reporting buffer status. The method may comprise: establishing a first MAC entity for a first eNodeB and a second MAC entity for a second eNodeB; identifying the first MAC entity on which an uplink data is to be transmitted among the first and second MAC entities, if the uplink data becomes available to be transmitted; and triggering a buffer status report (BSR) for the first MAC entity.

15 Claims, 11 Drawing Sheets

(51) Int. Cl.

| | |
|---|---|
| *H04B 7/14* | (2006.01) |
| *H04W 24/00* | (2009.01) |
| *H04W 36/00* | (2009.01) |
| *H04W 52/36* | (2009.01) |
| *H04W 28/02* | (2009.01) |
| *H04W 76/02* | (2009.01) |
| *H04L 29/12* | (2006.01) |
| *H04W 74/08* | (2009.01) |
| *H04W 28/06* | (2009.01) |
| *H04W 72/04* | (2009.01) |
| *H04W 80/02* | (2009.01) |
| *H04L 1/18* | (2006.01) |
| *H04W 28/18* | (2009.01) |
| *H04W 88/08* | (2009.01) |

(52) U.S. Cl.
CPC ....... *H04W 28/0278* (2013.01); *H04W 28/06* (2013.01); *H04W 72/0426* (2013.01); *H04W 74/0833* (2013.01); *H04W 76/025* (2013.01); *H04W 80/02* (2013.01); *H04W 28/18* (2013.01); *H04W 88/08* (2013.01)

(58) Field of Classification Search
CPC ... H04W 76/025; H04W 28/06; H04W 28/18; H04W 88/08; H04L 1/1887; H04L 1/1812; H04L 61/2092
See application file for complete search history.

(56) References Cited

U.S. PATENT DOCUMENTS

| | | | |
|---|---|---|---|
| 2009/0215459 A1* | 8/2009 | Kuo | H04W 74/002 455/436 |
| 2010/0034147 A1* | 2/2010 | Ho | H04L 1/18 370/328 |
| 2011/0064051 A1* | 3/2011 | Clerckx | H04B 7/022 370/331 |
| 2011/0170495 A1 | 7/2011 | Earnshaw et al. | |
| 2011/0261747 A1 | 10/2011 | Wang et al. | |
| 2011/0268087 A1 | 11/2011 | Kwon et al. | |
| 2011/0292873 A1 | 12/2011 | Guo | |
| 2011/0300858 A1* | 12/2011 | Lee | H04W 28/10 455/425 |
| 2011/0310800 A1* | 12/2011 | Lin | H04W 28/14 370/328 |
| 2012/0099452 A1 | 4/2012 | Dai et al. | |
| 2012/0140743 A1* | 6/2012 | Pelletier | H04W 72/0453 370/335 |
| 2012/0207089 A1 | 8/2012 | Kone | |
| 2012/0230245 A1* | 9/2012 | Ostergaard | H04W 72/0426 370/315 |
| 2012/0289170 A1 | 11/2012 | Li et al. | |
| 2013/0083677 A1* | 4/2013 | Kim | H04W 72/1284 370/252 |
| 2013/0114445 A1 | 5/2013 | Wen et al. | |
| 2014/0056278 A1 | 2/2014 | Marinier et al. | |
| 2014/0177560 A1* | 6/2014 | Guo | H04W 72/1268 370/329 |

FOREIGN PATENT DOCUMENTS

| | | |
|---|---|---|
| CN | 102326424 A | 1/2012 |
| CN | 102547669 A | 7/2012 |
| JP | 2011-142638 A | 7/2011 |
| JP | 2014-138337 A | 7/2014 |
| KR | 10-2009-0075635 A | 7/2009 |
| KR | 10-2011-0129835 A | 12/2011 |
| RU | 2427105 C1 | 8/2011 |
| WO | WO 2010/129146 A2 | 11/2010 |
| WO | WO 2010/129822 A1 | 11/2010 |
| WO | WO 2011/137576 A1 | 11/2011 |
| WO | WO 2012/071348 A1 | 5/2012 |
| WO | WO 2012/146210 A1 | 11/2012 |

OTHER PUBLICATIONS

NSN et al., "BSR and SR for Dual Connectivity," 3GPP TSG-RAN WG2 Meeting #84, R2-133855, San Francisco, USA, Nov. 11-15, 2013, 5 pages, XP050736692.

3GPP TS 36.321 V11.1.0, "3GPP; TSGRAN; Evolved Universal Terrestrial Radio Access (E-UTRA); Medium Access Control (MAC) protocol specification (Release 11)", Jan. 3, 2013, See Section 5.4.5.

3GPP "3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.2.0, Dec. 2012, pp. 1-340.

Anite, "GCF Priority 4—Correction to EUTRA MAC testcase 7.1.4.7a," 3GPP TSG-RAN5 Meeting #54, R5-120269, Dresden, Germany, Feb. 6-10, 2012, 1 page.

3GPP TSG RAN WG2 Meeting #81, "Discussion on Protocol Stack Support in Small Cell eNB", Research in Motion, UK Limited, R2-130068, St. Julian's, Malta, Jan. 28-Feb. 1, 2013, 7 pages.

3GPP TSG-RAN WG2 #81, "Dual Connectivity for Small Cell Deployments", InterDigital Communications, R2-130515, Malta, MT, Jan. 28-Feb. 1, 2013, 4 pages.

\* cited by examiner

[Fig. 1]
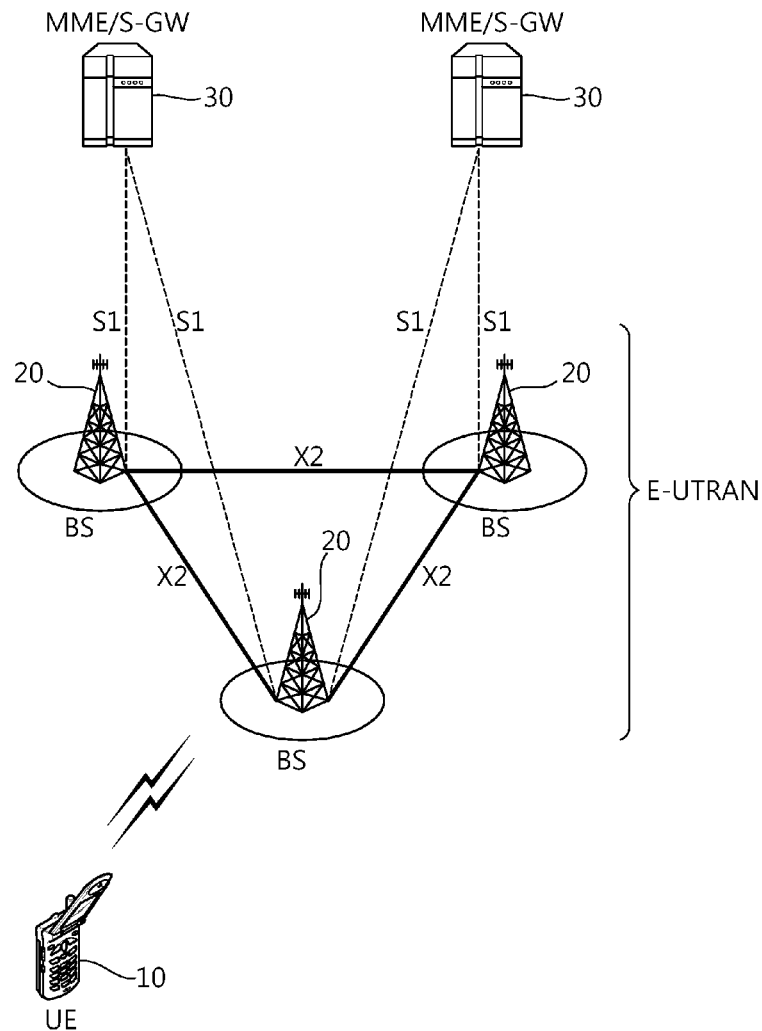
[Fig. 2]
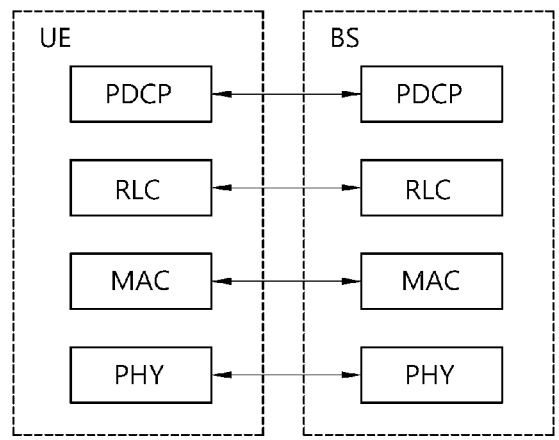

[Fig. 3]
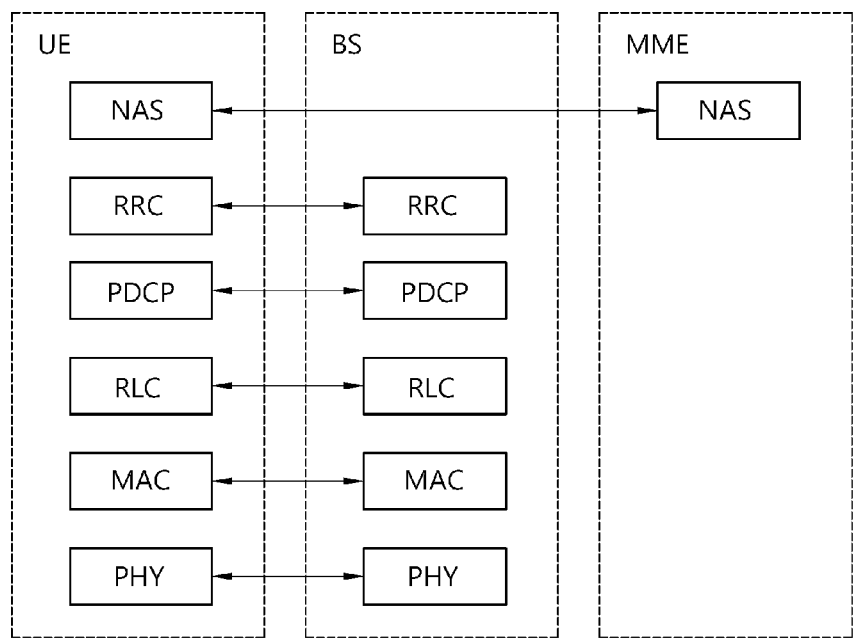
[Fig. 4]
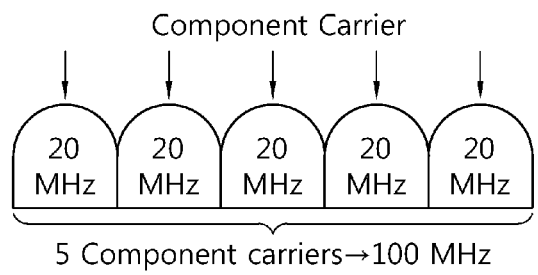

[Fig. 5]
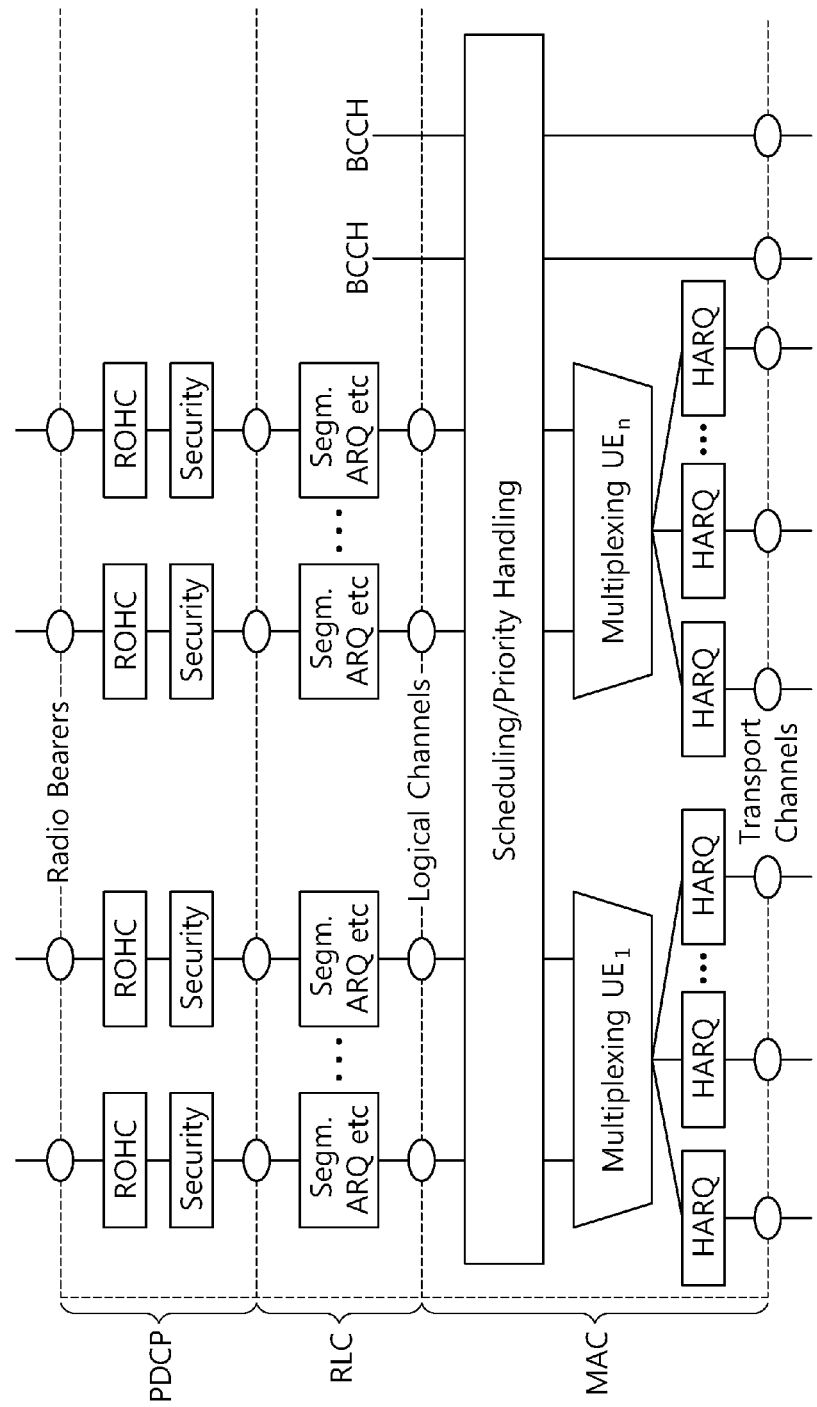

[Fig. 6]
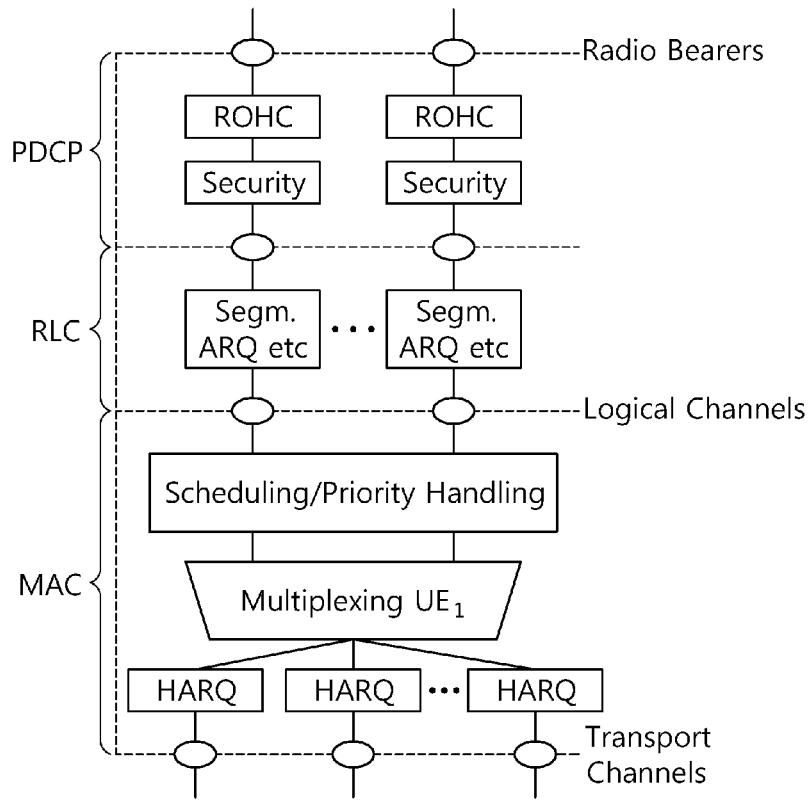
[Fig. 7]
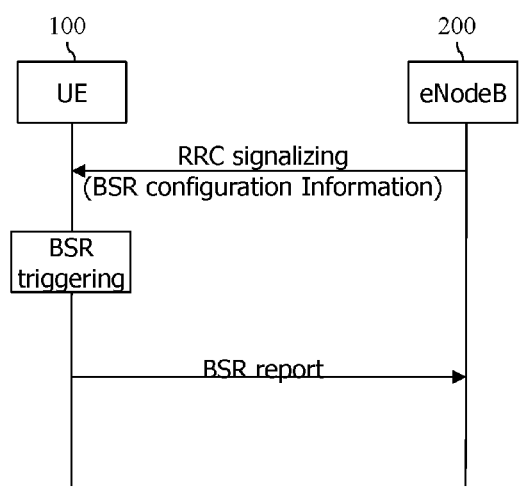

[Fig. 8]
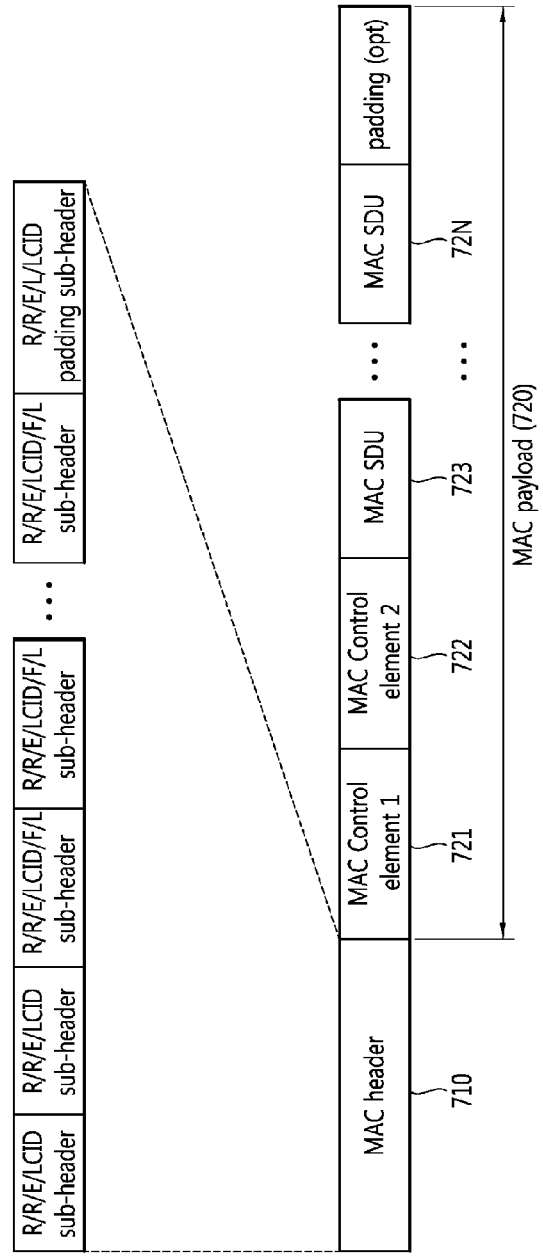
[Fig. 9a]
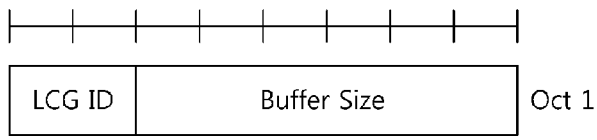

[Fig. 9b]
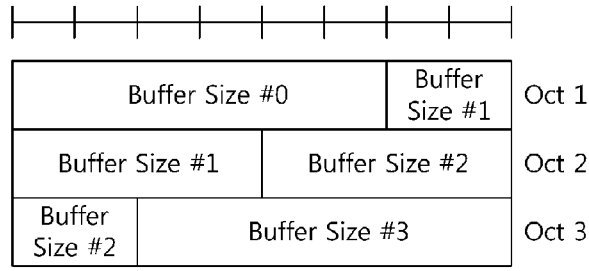
[Fig. 10]
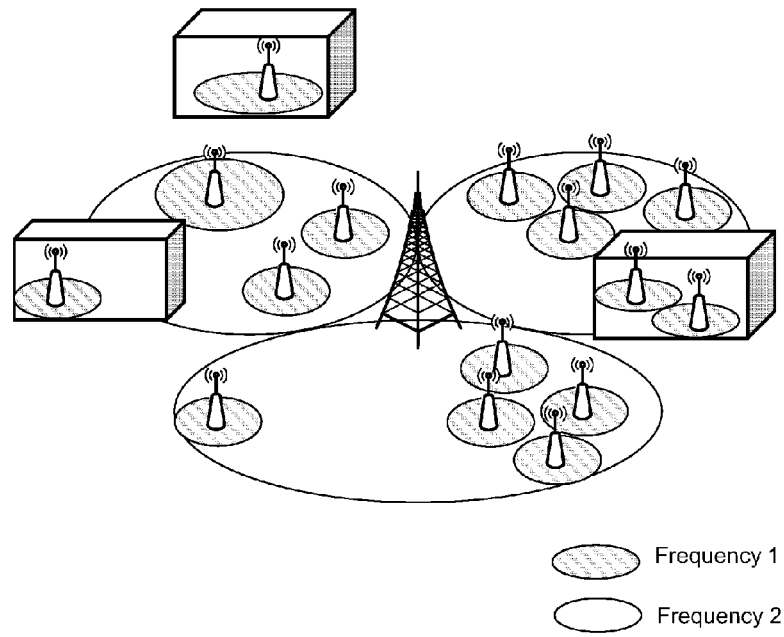
[Fig. 11]
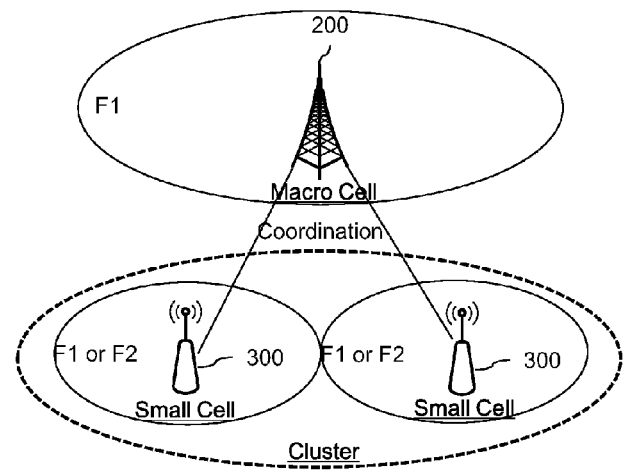

[Fig. 12]
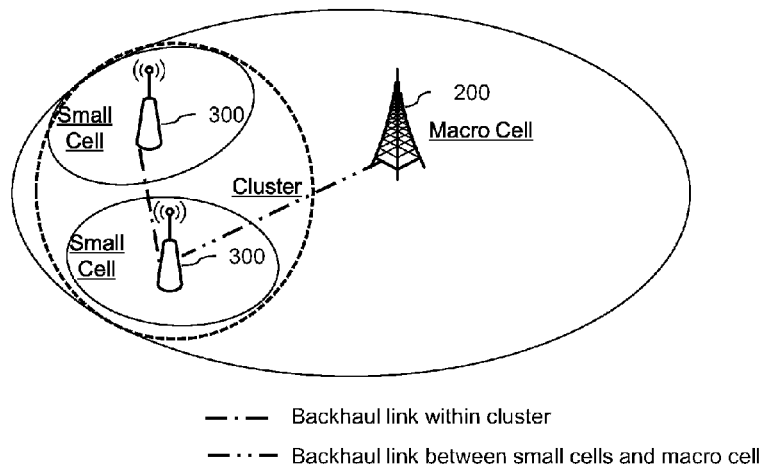
[Fig. 13a]
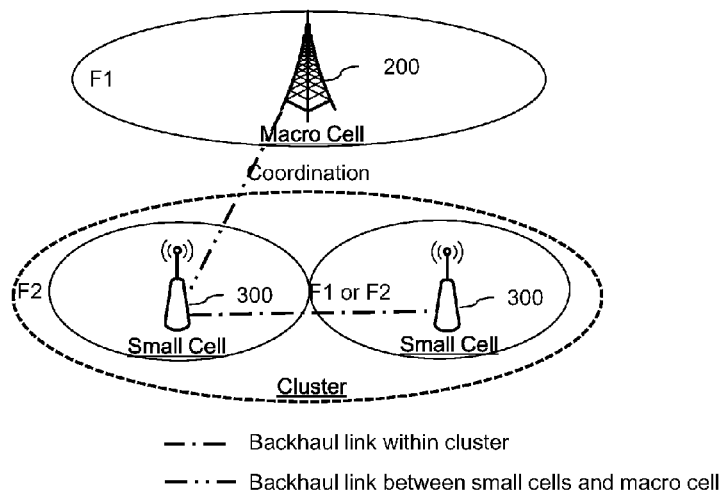
[Fig. 13b]
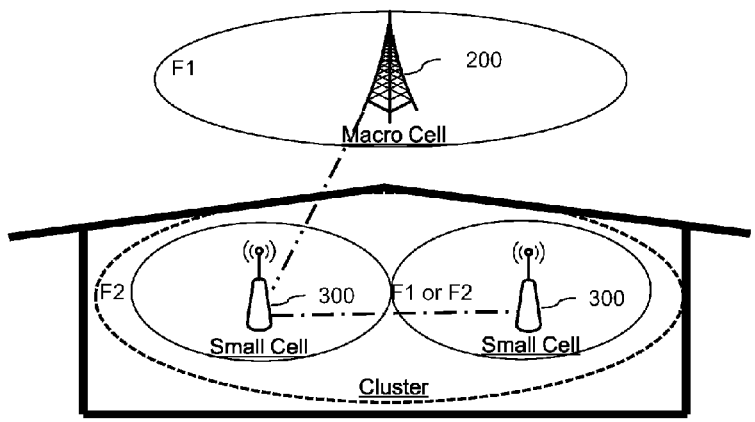

[Fig. 14]
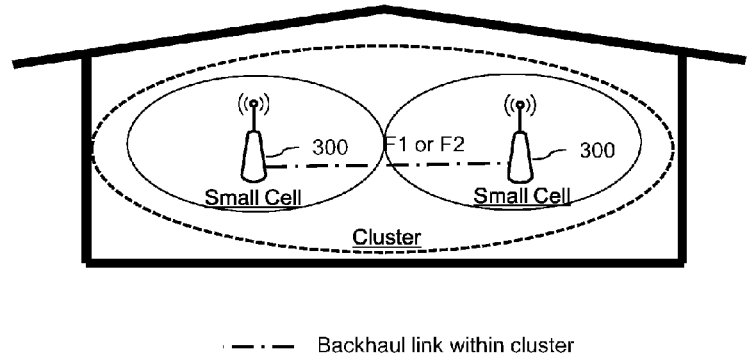
— · — Backhaul link within cluster
[Fig. 15]
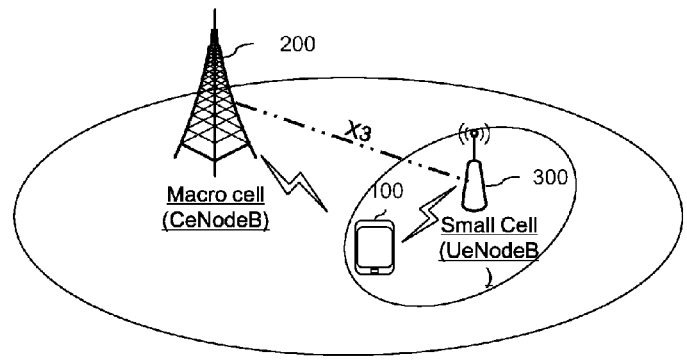
[Fig. 16]
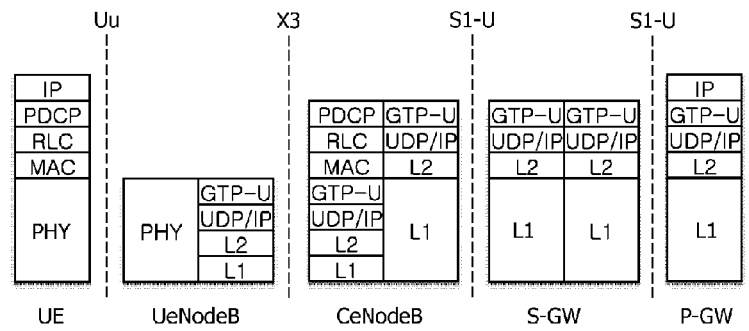
[Fig. 17]
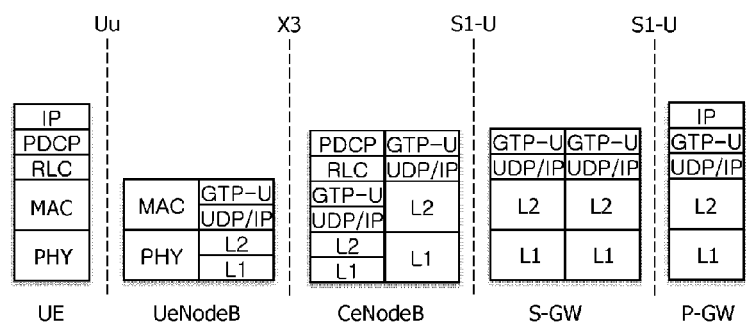

[Fig. 18]
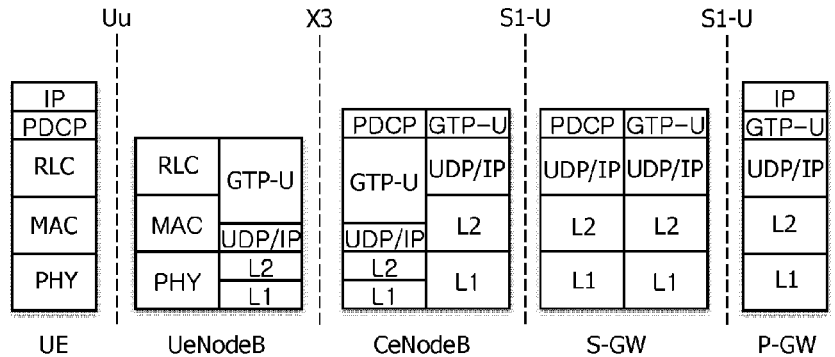
[Fig. 19]
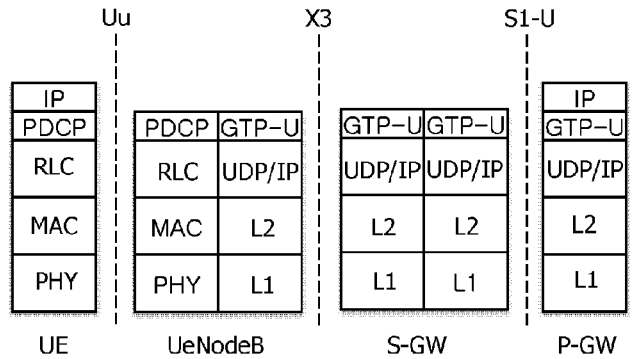
[Fig. 20]
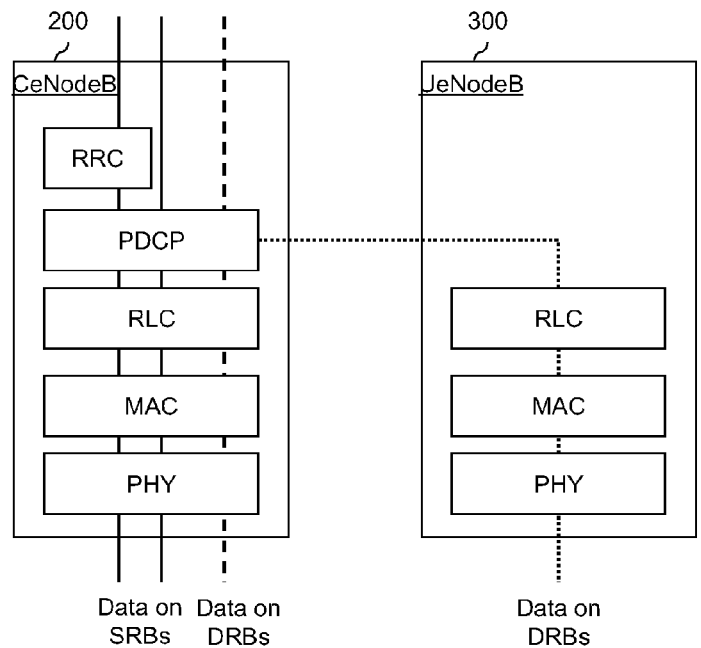

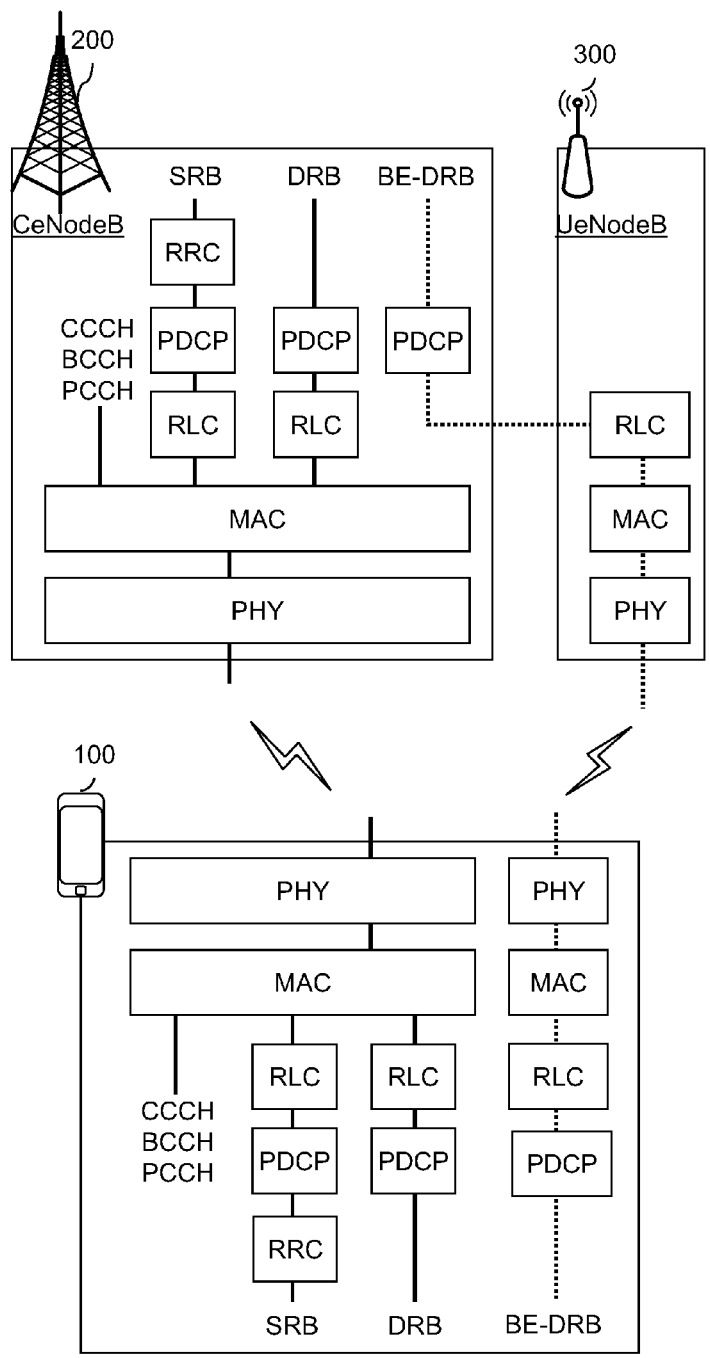
[Fig. 21]

[Fig. 22]
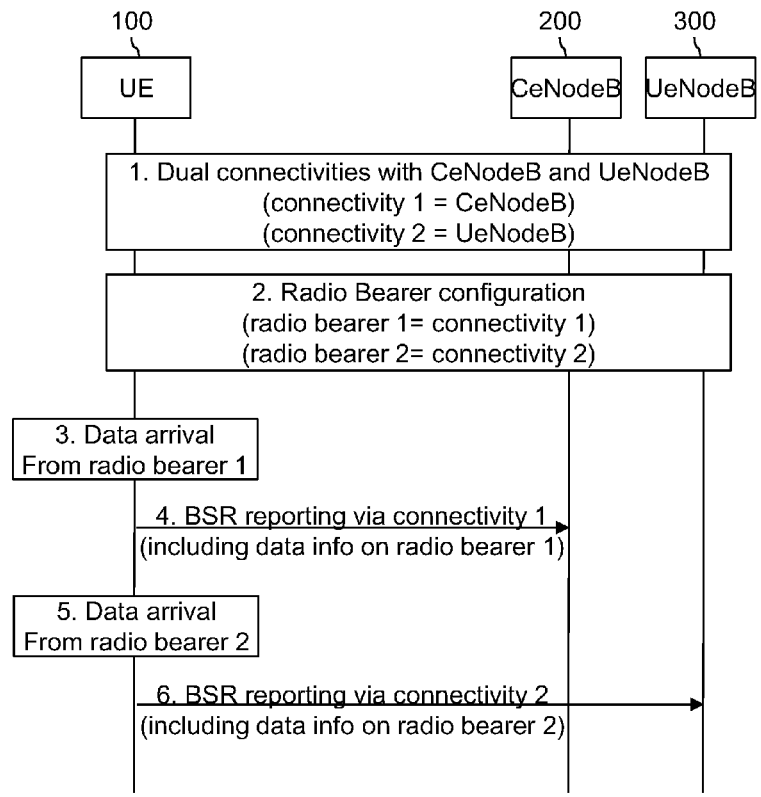
[Fig. 23]
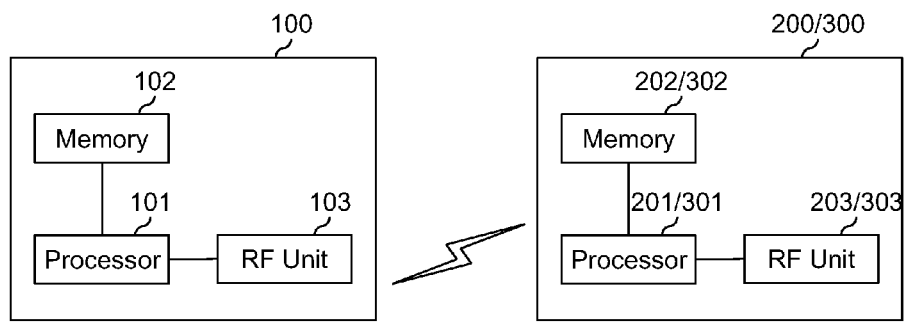

METHOD FOR REPORTING BUFFER STATUS AND COMMUNICATION DEVICE THEREOF

CROSS REFERENCE TO RELATED APPLICATIONS

This application is the National Phase of PCT International Application No. PCT/KR2014/000222, filed on Jan. 9, 2014, which claims priority under 35 U.S.C. 119(e) to U.S. Provisional Application No. 61/751,282, filed on Jan. 11, 2013 and 61/807,338, filed on Apr. 2, 2013, all of which are hereby expressly incorporated by reference into the present application.

TECHNICAL FIELD

The present invention relates to wireless communication, and more specifically, to a method for reporting buffer status and a communication device thereof.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Examples of techniques employed in the 3GPP LTE-A include carrier aggregation.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells. That is, the plurality of serving cells provides a user equipment with various services.

In recent, there is a discussion for adopting small cells.

DISCLOSURE OF INVENTION

Technical Problem

In the related art as above explained, due to adoption of the small cells, it will be possible for the UE to have dual connectivities to both a conventional cell and a small cell. However, there is yet no concept and technique to realize dual connectivities.

Therefore, an object of the present invention is to provide solutions to realize dual connectivities.

Solution to Problem

To achieve these and other advantages and in accordance with the purpose of the present invention, as embodied and broadly described herein, there is provided a method for reporting buffer status. The method may comprise: establishing a first MAC entity for a first eNodeB and a second MAC entity for a second eNodeB; identifying the first MAC entity on which an uplink data is to be transmitted among the first and second MAC entities, if the uplink data becomes available to be transmitted; and triggering a buffer status report (BSR) for the first MAC entity. Here, the BSR may include information on the uplink data of the first MAC entity. The method may further comprise transmitting the triggered BSR for the first MAC entity to the first eNodeB.

The method may comprise: identifying the second MAC entity on which an uplink data is to be transmitted among the first and second MAC entities, if the uplink data of the second MAC entity becomes available to be transmitted; and triggering another buffer status report (BSR) for the second MAC entity. Here, the another BSR may include information on the uplink data of the second MAC entity. The method may further comprise: transmitting the triggered another BSR for the second MAC entity to the second eNodeB.

Meanwhile, if the first eNodeB operates a plurality of cells, the first MAC entity may handle the plurality of cells of the first eNodeB. Also, if the second eNodeB operates a plurality of cells, the second MAC entity may handle the plurality of cells of the second eNodeB.

To achieve these and other advantages and in accordance with the purpose of the present invention, as embodied and broadly described herein, there is also provided a communication device configured for reporting buffer status. The communication device may comprise: a radio frequency (RF) unit; and a processor connected with the RF unit thereby to control to: establish a first MAC entity for a first eNodeB and a second MAC entity for a second eNodeB, identify the first MAC entity on which an uplink data is to be transmitted among the first and second MAC entities, if the uplink data becomes available to be transmitted, and trigger a buffer status report (BSR) for the first MAC entity.

Advantageous Effects of Invention

According to the present specification, the above-explained problem may be solved. In more detail, according to the one embodiment, the UE can trigger each buffer status report corresponding to each connectivity, if the uplink data becomes available to be transmitted. Therefore, the one embodiment may reduce a delay time required to exchange the BSR between eNodeBs in the existing BSR mechanism.

BRIEF DESCRIPTION OF DRAWINGS

FIG. 1 shows a wireless communication system to which the present invention is applied.

FIG. 2 is a diagram showing a radio protocol architecture for a user plane.

FIG. 3 is a diagram showing a radio protocol architecture for a control plane.

FIG. 4 shows an example of a wideband system using carrier aggregation for 3GPP LTE-A.

FIG. 5 shows an example of a structure of DL layer 2 when carrier aggregation is used.

FIG. 6 shows an example of a structure of UL layer 2 when carrier aggregation is used.

FIG. 7 is a view illustrating a procedure of a buffer status reporting.

FIG. 8 is a view illustrating the architecture of a medium access control (MAC) message for BSR.

FIG. 9a is a view illustrating a Short BSR MAC Control Element to which the present invention applies.

FIG. 9b is a view illustrating a Long BSR MAC Control Element to which the present invention applies.

FIG. 10 shows one exemplary concept of adoption of small cells.

FIG. 11 shows one exemplary concept of coexistence of a macro cell and small cells.

FIG. 12 shows one example of a first scenario of small cell deployment.

FIG. 13a shows one example of a second scenario of small cell deployment.

FIG. 13b shows another example of the second scenario of small cell deployment.

FIG. 14 shows one example of a third scenario of small cell deployment.

FIG. 15 shows a concept of dual connectivities

FIG. 16 shows exemplary protocol stack for user plane when the PHY layer is terminated in UeNodeB.

FIG. 17 shows exemplary protocol stacks for user plane when the MAC layer is terminated in UeNodeB.

FIG. 18 shows exemplary protocol stack and interfaces for user plane when the RLC layer is terminated in UeNodeB.

FIG. 19 shows exemplary protocol stack and interfaces for user plane when the PDCP layer is terminated in UeNodeB.

FIG. 20 shows radio protocols of eNodeBs for supporting dual connectivities.

FIG. 21 shows radio protocols of UE for supporting dual connectivities.

FIG. 22 shows one exemplary method according to one embodiment of the present disclosure.

FIG. 23 is a block diagram showing a wireless communication system to implement an embodiment of the present invention.

MODE FOR THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It may be noted that technological terms used herein are merely used to describe a specific embodiment, but not to limit the present invention. Also, unless particularly defined otherwise, technological terms used herein may be construed as a meaning that is generally understood by those having ordinary skill in the art to which the invention pertains, and may not be construed too broadly or too narrowly. Furthermore, if technological terms used herein are wrong terms unable to correctly express the spirit of the invention, then they may be replaced by technological terms that are properly understood by those skilled in the art. In addition, general terms used in this invention may be construed based on the definition of dictionary, or the context, and may not be construed too broadly or too narrowly.

Incidentally, unless clearly used otherwise, expressions in the singular number include a plural meaning. In this application, the terms "comprising" and "including" may not be construed to necessarily include all of the elements or steps disclosed herein, and may be construed not to include some of the elements or steps thereof, or may be construed to further include additional elements or steps.

The terms used herein including an ordinal number such as first, second, etc. can be used to describe various elements, but the elements may not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it may be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it may be noted that the accompanying drawings are merely illustrated to easily explain the spirit of the invention, and therefore, they may not be construed to limit the spirit of the invention by the accompanying drawings. The spirit of the invention may be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, a data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

FIG. 4 shows an example of a wideband system using carrier aggregation for 3GPP LTE-A.

Referring to FIG. 4, each CC has a bandwidth of 20 MHz, which is a bandwidth of the 3GPP LTE. Up to 5 CCs may be aggregated, so maximum bandwidth of 100 MHz may be configured.

FIG. 5 shows an example of a structure of DL layer 2 when carrier aggregation is used. FIG. 6 shows an example of a structure of UL layer 2 when carrier aggregation is used.

The carrier aggregation may affect a MAC layer of the L2. For example, since the carrier aggregation uses a plurality of CCs, and each hybrid automatic repeat request (HARQ) entity manages each CC, the MAC layer of the 3GPP LTE-A using the carrier aggregation shall perform operations related to a plurality of HARQ entities. In addition, each HARQ entity processes a transport block independently. Therefore, when the carrier aggregation is used, a plurality of transport blocks may be transmitted or received at the same time through a plurality of CCs.

<Buffer Status Reporting (BSR)>

Now, a buffer status reporting (BSR) will be described below. It may be referred to Section 5.4.5 of 3GPP TS 36.321 V10.5.0 (2012 March).

A BSR procedure is used to provide a serving eNB with information about an amount of data available for transmission in UL buffers of a UE.

In other word, the serving eNB needs to know a type of data and an amount of data which each user wants to transmit for using uplink radio resources efficiently. For downlink radio resources, the serving eNB can know an amount of data need to be transmitted to each user through downlink, since the data to be transmitted through the downlink is transferred from an access gateway to the serving eNB. On the other hand, for uplink radio resources, if a UE does not inform the serving eNB information on data to be transmitted through uplink, the serving eNB cannot know how much uplink radio resources are required for each UE. Therefore, for the serving eNB to allocate uplink radio resources to a UE properly, the UE is required to provide information for scheduling the uplink radio resources to the serving eNB.

Accordingly, if there is data to be transmitted to the serving eNB, a UE inform the the serving eNB that the UE has the data to be transmitted to the BS, and the BS allocates proper uplink radio resources to the UE based on the information. This procedure is called a buffer status reporting (BSR) procedure.

A UE needs uplink radio resources for transmitting a BSR to the serving eNB. If the UE has allocated uplink radio resources when the BSR is triggered, the UE immediately transmits the BSR to the serving eNB using the allocated uplink radio resources. If the UE does not have allocated uplink radio resources when the BSR is triggered, the UE performs a scheduling request (SR) procedure for receiving uplink radio resources from the serving eNB.

For the BSR procedure, the UE considers all radio bearers which are not suspended and may consider radio bearers which are suspended.

The BSR is triggered if any predefined event occurs. According to its event, the BSR can be classified as three types: regular BSR, padding BSR and periodic BSR.

A regular BSR may be triggered if uplink data, for a logical channel which belongs to a logical channel group (LCG), becomes available for transmission in the RLC entity or in the PDCP entity. The definition of what data are considered as available for transmission is specified in section 4.5 of 3GPP TS 36.322 V9.1.0 (2010 March) and section 4.5 of 3GPP TS 36.323 V9.0.0 (2009 December), respectively. The regular BSR may be triggered if the data belongs to a logical channel with higher priority than the priorities of the logical channels which belong to any LCG and for which data is already available for transmission. The regular BSR may also be triggered if there is no data available for transmission for any of the logical channels which belong to a LCG.

A padding BSR may be triggered if uplink resources are allocated and number of padding bits is equal to or larger than the size of the BSR MAC control element (CE) plus its subheader.

A regular BSR may be triggered if a retransmission BSR timer expires and the UE has data available for transmission for any of the logical channels which belong to a LCG.

A periodic BSR may be triggered if a periodic BSR timer expires.

FIG. 7 is a view illustrating a procedure of a buffer status reporting.

Referring to FIG. 7, an eNodeB 200 controls a BSR procedure associated with the logical channel in each UE through MAC-MainConfig signaling defined in the RRC layer. The RRC message includes information in a BSR periodic timer (periodicBSR-Timer) and/or a BSR re-transmission timer (retxBSR-Timer). Further, the RRC message includes configuration information associated with the format of BSR and data size.

At any time, the UE triggers a BSR.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

Based on the BSR triggering, the UE may transmit a BSR report. The BSR is configured in consideration of the configuration information established by RRC signaling.

FIG. 8 is a view illustrating the architecture of a medium access control (MAC) message for BSR.

A MAC Protocol Data Unit (PDU) includes a MAC header 710, zero or more MAC control elements (CEs) 721 and 722, zero or more MAC service data units (SDUs) 723 and optionally padding bits. Both the MAC header 710 and the MAC SDUs 723 are of variable sizes. The MAC SDUs 723 is a data block provided from a higher layer (e.g., an RLC layer or an RRC layer) of a MAC layer. The MAC CE 721 or 722 is used to deliver control information of the MAC layer such as a BSR.

The MAC PDU header 710 includes one or more subheaders. Each subheader corresponds to either a MAC SDU, a MAC CE or padding bits.

The subheader includes six header fields R/R/E/LCID/F/L but for the last subheader in the MAC PDU and for fixed sized MAC CEs. The last subheader in the MAC PDU and subheaders for fixed sized MAC CEs include solely of the four header fields R/R/E/LCID. A subheader corresponding to the padding bits includes four header fields R/R/E/LCID.

Descriptions on each field are as follows.

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

As shown in FIG. 8, the BSR is transmitted in a form of MAC signaling, and the BSR configured by the UE is identified by a setting value of the LCID (Logical Channel ID) of the MAC header 710. By way of example, in case the LCID value is set as 11101, this denotes that aBSR MAC CE 720 having a short BSR format is transmitted (refer to FIG. 9), and in case the LCID value is set as 11110, this denotes that a BSR MAC CE 720 having a long BSR format is transmitted (refer to FIG. 10). Accordingly, the base station may recognize the BSR format of the MAC CE through the LCID value of the MAC header.

FIG. 9a is a view illustrating a Short BSR MAC Control Element to which the present invention applies.

Referring to FIG. 9a, the Short BSR and Truncated BSR forma has one LCG ID field and one corresponding Buffer Size field. Herein LCG ID (The Logical Channel Group ID, 810) field identifies the group of logical channel(s) which UE buffer status is being reported. The length of the field is 2 bits. The Buffer Size (820) identifies the total amount of data available across all logical channels of the LCG, and the length of this field is 6 bits.

FIG. 9b is a view illustrating a Long BSR MAC Control Element to which the present invention applies.

The long BSR includes the buffer amount (size) in the order from the logical channel group with LCG ID 0 (910) to the logical channel group with LCG ID 3 (940) without any logical channel group identifier. Here, one LCG includes one or more RBs, and the buffer size field value for the LCG is the total sum of data available for transmission in the RLC layer and the PDCP of all the RBs included in the LCG.

At this time, the data available for transmission in the PDCP and RLC layer may be defined as follows.

Data available for transmission in RLC

For the purpose of MAC buffer status reporting, the UE shall consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and the status prohibit timer is not running or has expired, the UE shall estimate the size of the STATUS PDU that will be transmitted in the next transmission opportunity, and consider this as data available for transmission in the RLC layer.

Data available for transmission in PDCP

For the purpose of MAC buffer status reporting, the UE shall consider PDCP Control PDUs, as well as the following as data available for transmission in the PDCP layer:

For SDUs for which no PDU has been submitted to lower layers:

the SDU itself, if the SDU has not yet been processed by PDCP, or the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:

the SDU, if it has not yet been processed by PDCP, or the PDU once it has been processed by PDCP.

Here, the UE determines an index that is a value to be inserted into the buffer size field (6 bits) in consideration of 'extendedBSR-Sizes is configured/or not configured' with respect to the amount of data to be transmitted.

The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The length of this field is 6 bits. The values taken by the Buffer Size field are shown in Table 1.

TABLE 1

| Index | Buffer Size value [bytes] |
|---|---|
| 0 | BS = 0 |
| 1 | 0 < BS <= 10 |
| 2 | 10 < BS <= 12 |

TABLE 1-continued

| Index | Buffer Size value [bytes] |
|---|---|
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

According to Table 1, BSR can report the buffer size that is ranged from 0 to 150 kbytes or more than 150 kbytes.

<Small Cell>

Now, a concept of small cell will be described.

In the 3rd or 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

FIG. 10 shows one exemplary concept of adoption of small cells.

Small cells using low power nodes are considered promising to cope with mobile traffic explosion, especially for hotspot deployments in indoor and outdoor scenarios. A low-power node generally means a node whose Tx power is lower than macro node and BS classes, for example Pico and Femto eNB are both applicable. Small cell enhancements for E-UTRA and E-UTRAN will focus on additional functionalities for enhanced performance in hotspot areas for indoor and outdoor using low power nodes.

As shown in FIG. 10, small cell enhancement may target both with and without macro coverage, both outdoor and indoor small cell deployments and both ideal and non-ideal backhaul. Both sparse and dense small cell deployments may be considered.

(A). With and without Macro Coverage

As shown in FIG. 10, small cell enhancement may target the deployment scenario in which small cell nodes are deployed under the coverage of one or more than one overlaid E-UTRAN macro-cell layer(s) in order to boost the capacity of already deployed cellular network. Two scenarios can be considered:

Where the UE is in coverage of both the macro cell and the small cell simultaneously Where the UE is not in coverage of both the macro cell and the small cell simultaneously FIG. 10 also shows the scenario where small cell nodes are not deployed under the coverage of one or more overlaid E-UTRAN macro-cell layer(s). This scenario is also the target of the small cell enhancement Study Item.

(B). Outdoor and Indoor

Small cell enhancement may target both outdoor and indoor small cell deployments. The small cell nodes could be deployed indoors or outdoors, and in either case could provide service to indoor or outdoor UEs.

For indoor UE, only low UE speed (0 ? 3 km/h) is targeted. For outdoor, not only low UE speed, but also medium UE speed (up to 30 km/h and potentially higher speeds) is targeted.

Both throughput and mobility/connectivity shall be used as performance metric for both low and medium mobility. Cell edge performance (e.g. 5%-tile CDF point for user throughput) and power efficiency (of both network and UE) are also used as metrics for further study.

(C). Ideal and Non-Ideal Backhaul

Both ideal backhaul (i.e., very high throughput and very low latency backhaul such as dedicated point-to-point connection using optical fiber, LOS microwave) and non-ideal backhaul (i.e., typical backhaul widely used in the market such as xDSL, NLOS microwave, and other backhauls like relaying) may be studied. The performance-cost trade-off may be taken into account.

A categorization of non-ideal backhaul based on operator inputs is listed in Table 2:

TABLE 2

| Backhaul Technology | Latency (One way) | Throughput | Priority (1 is the highest) |
| --- | --- | --- | --- |
| Fiber Access 1 | 10-30 ms | 10M-10 Gbps | 1 |
| Fiber Access 2 | 5-10 ms | 100-1000 Mbps | 2 |
| DSL Access | 15-60 ms | 10-100 Mbps | 1 |
| Cable | 25-35 ms | 10-100 Mbps | 2 |
| Wireless Backhaul | 5-35 ms | 10 Mbps 100 Mbps typical, maybe up to Gbps range | 1 |

A categorization of good to ideal backhaul based on operator inputs is listed in Table 3:

TABLE 3

| Backhaul Technology | Latency (One way) | Throughput | Priority (1 is the highest) |
| --- | --- | --- | --- |
| Fiber | 2-5 ms | 50M-10 Gbps | 1 |

For interfaces between macro and small cell, as well as between small cells, the present disclosure may first identify which kind of information is needed or beneficial to be exchanged between nodes in order to get the desired improvements before the actual type of interface is determined. And if direct interface may be assumed between macro and small cell, as well as between small cell and small cell, X2 interface can be used as a starting point.

(D). Sparse and Dense

Small cell enhancement may consider sparse and dense small cell deployments. In some scenarios (e.g., hotspot indoor/outdoor places, etc.), single or a few small cell node(s) are sparsely deployed, e.g. to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Furthermore, smooth future extension/scalability (e.g.: from sparse to dense, from small-area dense to large-area dense, or from normal-dense to super-dense) may be considered. For mobility/connectivity performance, both sparse and dense deployments may be considered with equal priority.

(E). Synchronization

Both synchronized and un-synchronized scenarios may be considered between small cells as well as between small cells and macro cell(s). For specific operations e.g. interference coordination, carrier aggregation and inter-eNB COMP, small cell enhancement can benefit from synchronized deployments with respect to small cell search/measurements and interference/resource management. Therefore time synchronized deployments of small cell clusters are prioritized in the study and new means to achieve such synchronization shall be considered.

(F). Spectrum

Small cell enhancement may address the deployment scenario in which different frequency bands are separately assigned to macro layer and small cell layer, respectively, where F1 and F2 in FIG. 10 correspond to different carriers in different frequency bands.

Small cell enhancement may be applicable to all existing and as well as future cellular bands, with special focus on higher frequency bands, e.g., the 3.5 GHz band, to enjoy the more available spectrum and wider bandwidth.

Small cell enhancement may also take into account the possibility for frequency bands that, at least locally, are only used for small cell deployments.

Co-channel deployment scenarios between macro layer and small cell layer may be considered as well.

The duplication of activities with existing and coming 3GPP Study Items/Work Items may be avoided.

Some example spectrum configurations are:
  Carrier aggregation on the macro layer with bands X and Y, and only band X on the small cell layer
  Small cells supporting carrier aggregation bands that are co-channel with the macro layer
  Small cells supporting carrier aggregation bands that are not co-channel with the macro layer One potential co-channel deployment scenario is dense outdoor co-channel small cells deployment, considering low mobility UEs and non ideal backhaul. All small cells are under the Macro coverage.

Small cell enhancement may be supported irrespective of duplex schemes (FDD/TDD) for the frequency bands for macro layer and small cell layer. Air interface and solutions for small cell enhancement may be band-independent, and aggregated bandwidth per small cell may be no more than 100 MHz, at least for 3GPP Release 12.

(G). Traffic

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain may be considered. Non-full buffer and full buffer traffic are both included, and non-full buffer traffic is prioritized to verify the practical cases. More detailed evaluation methodologies may be studied at 3GPP Working Group level in subsequent physical layer and high layers Study Items of small cell enhancement.

CSG/hybrid is an independent topic which can be treated in other WI/SI. Solutions agnostic to CSG/hybrid or open access can be also applied to CSG/hybrid.

(H). Backward Compatibility

Backward compatibility, i.e. the possibility for legacy (pre-Release 12) UEs to access a small-cell node/carrier, is desirable for small cell deployments.

The introduction of non-backwards compatible features may be justified by sufficient gains.

(I). Deployment Use Cases

Operator deployed scenario (i.e. the operator performs cell planning and installs/maintains small cell nodes) may be supported for small cell enhancement.

User deployed scenarios, for example small cell nodes deployed in office buildings by organizational users, could be supported for small cell enhancement with a lower priority.

Automatic mechanisms such as plug-and-play provisioning to support flexible configuration and lower cost for operation and maintenance could be considered for both operator- and user-deployed scenarios, taking into account the possible absence of radio planning on these deployments.

Even in operator deployed scenario, the reduction in cell planning efforts compared to Releases 10/11 may be considered.

(J). Co-Existence and Interworking

For small cell enhancement, the same inter-RAT interworking capabilities with at least the same performance as in 3GPP Release 10/11 E-UTRAN shall be supported assuming the small cells support the 3GPP Releases 10/11 mechanisms.

(K). Core Network Aspects

Small cell enhancement may minimize signalling load (e.g., caused by mobility) to the core network as well as increase of backhaul traffic due to increasing number of small cell nodes.

(L). Capability and Performance Requirements

The enhancements may focus on cell capacity i.e. achievable user throughput and system throughput in typical coverage situations and with typical terminal configurations, including terminals with 2 RX antennas and supporting a single component carrier.

(M). System Performance

Small cell enhancement may support significantly increased user throughput for both downlink and uplink with main focus on typical user throughput (e.g. 50% and, for coverage limited scenarios, 5% point of CDF of the user throughput), given a reasonable system complexity. Actual quantitative requirements can be determined in succeeding study items on physical and higher layer enhancements.

Consistent user experience over the coverage area is highly desirable. Small cell enhancement may keep the fairness of the user throughput for both downlink and uplink in a scenario, where user distribution is dynamically changing.

Small cell enhancement may target the capacity per unit area (e.g. bps/km2) to be as high as possible, for a given user and small cell distribution, typical traffic types and considering a reasonable system complexity.

The small cell enhancements may evaluate the impact of the actual backhaul delays and provide solutions with the aim of improved system performance. Other aspects, for example service quality of VoLTE (e.g. MOS score) and delay/jitter impacts on services (video streaming, video calls, etc.), could also be addressed in follow-on studies.

(N). Mobility Performance

Small cell enhancement may support mobility which is required for the deployment scenarios.

Small cell enhancement may support mobility which is required for the future spectrum use in higher frequency bands (e.g. more available spectrum and wider bandwidth).

Small cell enhancement may support mobility for flexible coverage conditions described.

For UEs being served on a macro layer and for the targeted mobile speeds up to 30 km/h, small cell nodes need to be discovered, and potential mobility to small cell node performed, in a timely manner and with low UE power consumption in a situation when the UE moves into the coverage area of the small cell layer.

Mobility across densely deployed small cell nodes, and between macro and small cell on the same frequency layer, may be targeted with good performance for mobile speeds up to 30 km/h.

Mobility enhancements for higher speeds (e.g. 50-80 km/h) in small cell enhancements, e.g. for offload from vehicular UEs in outdoor small cells, can be studied in succeeding study items. Solutions for excluding very high mobility users may be considered.

The benefits of allowing high speed UE in small cells may be evaluated e.g. UE throughput gain, improved robustness of mobility, improved UE power efficiency, and up to which speed offloading is beneficial. Other topics e.g. how UE speed can be estimated in small cells can also be treated in succeeding study items of small cell enhancements.

Real-time services may be supported in small cell enhancement. The impact of mobility between small cell nodes and between small cell and overlaid macro nodes on quality (e.g. interruption time, packet loss) may be less than or equal to that provided by 3GPP Release 10/11 E-UTRA/E-UTRAN.

Small cell enhancement may consider techniques and mechanisms to reduce C-plane/U-plane latency and packet loss during mobility between macro cell nodes and small cell nodes, as well as between small cell nodes compared to 3GPP Release 10/11 E-UTRA/E-UTRAN.

Mobility enhancements considered under the future technical Study Item may be relevant to the deployment scenarios. Further enhancements which are not covered by other Study Items/Work Items (e.g. HetNet Mobility) may be considered, and duplicated work may be avoided.

(O). Coverage Performance

Small cell enhancement coverage may be sufficiently flexible for both uplink and downlink to support a variety of deployment scenarios.

(P). Architecture

The E-UTRAN architecture may be able to achieve the system and mobility performance targeted for small cell enhancement. The studies for architecture may first identify which kind of information is needed or beneficial to be exchanged between nodes in order to get the desired improvements before the actual type of interface is determined.

(Q). Cost and Complexity

Small cell enhancement shall satisfy the required performance. Additionally, cost and complexity shall be minimized in order to support small cell enhancement deployments.

Small cell enhancement may allow for low network cost by:
  allowing for solutions aiming at different backhauls,
  allowing for low-cost deployment, low operation and maintenance tasks, e.g. by means of SON functionality, minimization of drive tests, etc.,
  allowing for reduced base station implementation cost, considering e.g. relaxation of RF requirements in small cell scenarios It is noted that all the interfaces specified shall be open for multi-vendor equipment interoperability.

Small cell enhancement may be possible to implement with low incremental complexity of UE and allow for long UE battery life (standby and active).

Different UE capabilities may be considered for small-cell enhancements, especially with respect to features related to UE RF complexity such as the possibility for simultaneous transmission to and reception from the macro and small cell layers.

System complexity shall be minimized in order to stabilize the system & interoperability in earlier stage and decrease the cost of terminal & network. For these requirements, the following shall be taken into account:
  Minimize the number of options
  No redundant mandatory features
  Limit the number of necessary test cases, e.g. by limiting the number of states of protocols and the number of procedures, with appropriate parameter range and granularity (R). Energy Efficiency Small cell enhancement may target the network energy efficiency to be as high as possible, given a reasonable system complexity with considering the traffic characteristics of small cell enhancement. Furthermore, placing small cells in a dormant mode could be supported considering the increased likelihood of small cells not serving any active users. The trade-off between user throughput/capacity per unit area and network energy efficiency may be considered.

High UE energy efficiency may be targeted taking into account the small cell's short range transmission path. This means balancing effort in terms of UE energy efficiency, e.g., reducing required energy/bit for the UL, UE mobility measurements, cell identification and small cell discovery, end-user experience and system performance.

(S). Security

The small cell enhancement area architecture may have a comparable level of security as Release 10/11 E-UTRA and E-UTRAN for the deployment scenarios of small cell enhancement.

FIG. 11 shows one exemplary concept of coexistence of a macro cell and small cells.

As shown in FIG. 11, a cell of a conventional BS or eNodeB (200) may be called as a macro cell over small cells. Each small cell is operated by each small BS or eNodeB (300). When the conventional BS or eNodeB (200) may operate in use of a frequency F1, each small cell operates in use of a frequency F1 or F2. Small cells may be grouped in a cluster. It is noted that actual deployment of small cells are varied depending on operator's policy.

FIG. 12 shows one example of a first scenario of small cell deployment.

As shown in FIG. 12, the small cells may be deployed in the presence of an overlaid macro cell. That is, the small cells may be deployed in a coverage of the macro cell. In such deployment, the following may be considered.

Co-channel deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered
Both ideal backhaul and non-ideal backhaul may be also considered for the following interfaces: an interface between the small cells within the same cluster and an interface between a cluster of small cells and at least one macro eNodeB.
Non-ideal backhaul is assumed for all other interfaces.

Here, the non-ideal backhaul means that there may be a delay up to 60 ms.

FIG. 13a shows one example of a second scenario of small cell deployment.

As shown in FIG. 13a, the small cells may be deployed outdoor. In such deployment, the following may be considered.

The small cells are deployed in the presence of an overlaid macro network
Separate frequency deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered.
Both ideal backhaul and non-ideal backhaul may be also considered for the following interfaces: an interface between the small cells within the same cluster and an interface between a cluster of small cells and at least one macro eNB
Non-ideal backhaul is assumed for all other interfaces FIG. 13b shows another example of the second scenario of small cell deployment.

As shown in FIG. 13b, the small cells may be deployed indoor. In such deployment, the following may be considered.

The small cells are deployed in the presence of an overlaid macro network
Separate frequency deployment of the macro cell and small cells
Indoor small cell deployment is considered
Small cell cluster is considered
The small cells are dense in cluster
Details regarding the number/density of small cells per cluster, backhaul link for coordination among small cells and time synchronization among small cells may also be considered.
A sparse scenario can be also considered such as the indoor hotspot scenario.
Both ideal backhaul and non-ideal backhaul may be also considered for the following interfaces: an interface between the small cells within the same cluster and an interface between a cluster of small cells and at least one macro eNB
Non-ideal backhaul is assumed for all other interfaces.

FIG. 14 shows one example of a third scenario of small cell deployment.

As shown in FIG. 14, the small cells may be deployed indoor. In such deployment, the following may be considered.

Macro cell coverage is not present
Indoor deployment scenario is considered
Small cell cluster is considered
The small cells are dense in cluster
Details regarding the number/density of small cells per cluster, backhaul link for coordination among small cells and time synchronization among small cells may also be considered.
A sparse scenario can be considered such as the indoor hotspot scenario.
Both ideal backhaul and non-ideal backhaul may be also considered for the following interfaces: an interface between the small cells within the same cluster.
Non-ideal backhaul is assumed for all other interfaces.

FIG. 15 shows a concept of dual connectivities

As illustrated in FIG. 15, the UE 100 has dual connectivities to both Macro cell and small cell. Here, the connectivity means the connection to eNodeB for data transfer. If the UE is served by both one macro cell and one small cell, it can be said that the UE has dual connectivities, i.e., one connectivity for the macro cell and another connectivity for the small cell. If the UE is served by small cells, it can be said that the UE has multiple connectivity.

The macro cell is served by CeNodeB (or CeNB) and the small cell or group of small cells is served by UeNodeB (or UeNB). The CeNodeB means Control plane eNodeB that is responsible for managing control plane specific operations, e.g., RRC connection control and mobility, e.g., transfer of control data on signaling radio bearers (SRBs). The UeNodeB means User plane eNodeB that is responsible for managing user plane specific operations, e.g., transfer of data on data radio bearers (DRBs).

The small cell of UeNodeB is responsible for transmitting best effort (BE) type traffic, while the macro cell of the CeNodeB is responsible for transmitting other types of traffic such as VoIP, streaming data, or signaling data.

It is noted that there is X3 interface between CeNodeB and UeNodeB that is similar to conventional X2 interface between eNodeBs.

Here, the followings are considered:
CeNB and UeNB are different nodes.
Macro cell is served by CeNb and small cell or group of small cells is served by UeNB.
Transfer of data on SRBs is performed on CeNB.
there is X3 interface between CeNB and UeNB that is similar to conventional X2 interface between eNBs.
Because RRC connection reconfiguration is managed in CeNB, CeNB may send information about DRB configurations to UeNB via X3 interface.

If there is the MAC layer in CeNB and is anther MAC layer in UeNB, it is possible that:
The MAC layer in CeNB may be configured with All SRBs and/or zero, one or more DRBs
The MAC layer in UeNB may be configured with zero or one SRB and/or one or more DRBs
As another means, it is also possible that
The MAC layer in CeNB may be configured with all SRBs
The MAC layer in UeNB may be configured with all DRBs.

FIG. 16 shows exemplary protocol stack for user plane when the PHY layer is terminated in UeNodeB.

As shown in FIG. 16, termination points of MAC layer, RLC layer and PDCP layer in L2 protocols between the UE and the eNodeB are in CeNodeB.

Because termination point of the PHY layer is in UeNodeB, functions of the MAC layer, RLC layer and PDCP layer are performed in CeNodeB. This way would require tight interaction between UeNodeB and CeNodeB because some of the PHY layer and the MAC layer are closely coupled.

For example, UeNodeB needs to indicate/forward information about transmissions/reception of TBs and HARQ feedbacks to CeNodeB via X3 interface. Also, because scheduling is performed in MAC layer, CeNodeB manages scheduling for UeNodeB.

In other word, for DL data transmissions in UeNodeB, CeNodeB forwards DL data (transport blocks) to UeNodeB because in principle the MAC layer generates transport blocks and forwards them to the PHY layer. Also, UeNodeB forwards corresponding feedback information received from the UE to the CeNodeB because HARQ retransmissions are handled in the MAC layer.

For UL data transmission, because information about amount of UL data in the UE is known only in the MAC layer, CeNodeB indicates scheduling information to the UeNodeB. The scheduling information includes how much radio resources needs to be scheduled to which UE. Then, UeNodeB schedules the UE and receives TBs from the UE. Then, UeNodeB forwards the TBs to CeNodeB. CeNodeB decodes the received TBs and indicates results to UeNodeB so that the subsequent transmissions can be made in UeNodeB.

FIG. 17 shows exemplary protocol stacks for user plane when the MAC layer is terminated in UeNodeB.

Because functions provided by the MAC layer is cell-specific, e.g., scheduling and HARQ, it would be a reasonable way to locate the MAC layer in UeNodeB. For the UeNodeB to schedule its UE, it needs to know scheduling information from the UE and CeNodeB.

For UL scheduling, the UeNodeB knows amount of data on DRBs from the BSR reported by the UE.

For DL scheduling, because UeNodeB is connected to P-GW via CeNodeB, CeNodeB forwards data on DRBS that UeNodeB needs to schedule to UE.

If the UeNodeB transmits data to the UE, UeNodeB indicates information about data transmission to CeNodeB. For example, UeNodeB indicates whether data is successfully transmitted or not. If the UeNodeB receives data from the UE, UeNodeB forwards the data to the CeNodeB.

Because the MAC layer is located in UeNodeB, MAC functions are separately performed per cell, i.e., apart from the MAC in CeNodeB, the MAC performs following functions for UeNodeB:

Buffer Status Reporting: Assuming that there are only DRBs between the UE and the UeNodeB, the UE reports BSR including information about data on DRBs.

Scheduling Request: a Regular BSR due to data on DRBs triggers SR to the UeNodeB. If SR is triggered, the UE sends SR to UeNodeB.

Power Headroom Reporting: the UE reports power headroom of cells under UeNodeB to the UeNodeB.

DRX: UE can be configured with UeNodeB specific DRX parameters. Therefore, the UE operates DRX with UeNodeB specific parameters to monitor the PDCCH on the UeNodeB.

However, because interactions are still required between the MAC layer and the RLC layer for e.g., Logical channel prioritization like procedure in eNodeB, CeNodeB needs to forward information about DL data available for transmissions to the UeNodeB. Upon this information, UeNodeB generates MAC PDUs to be sent to the UE.

FIG. 18 shows exemplary protocol stack and interfaces for user plane when the RLC layer is terminated in UeNodeB.

As shown in FIG. 18, MAC layer and the RLC layer are located in UeNodeB. Because the MAC layer is in UeNodeB, MAC functions are same as MAC termination in UeNodeB.

Because conventional RLC operation is already radio bearer-specific, there would be no big impacts if one RLC layer only for SRBs is in CeNodeB and another RLC layer only for DRBs is in UeNodeB.

Furthermore, because RLC layer and MAC layer are located in the same node, i.e., in UeNodeB, no information exchanged between CeNodeB and UeNodeB is necessary from RLC and MAC layers interaction point of view.

However, because there is no PDCP layer in UeNodeB, there is still need to forward data between CeNodeB and UeNodeB.

FIG. 19 shows exemplary protocol stack and interfaces for user plane when the PDCP layer is terminated in UeNodeB.

As shown in FIG. 19, because all L2 layers are located in UeNodeB, the UeNodeB is directly connected to S-GW so that IP packets are transported to P-GW via S-GW. Therefore, data forwarding between the UeNodeB and CeNodeB is not necessary. I.e., UeNodeB directly receives DL data from S-GW and sends them to the UE. UeNodeB receives UL data from the UE and directly send them to S-GW.

Because PHY layer and MAC layer should be located in the same node and because RLC layer and PDCP layer are radio bearer-specific, this way is the most reasonable in terms of amount of information exchanged between UeNodeB and CeNodeB.

FIG. 20 shows radio protocols of eNodeBs for supporting dual connectivities.

For dual or multiple connectivities, MAC functions of the UE 100 needs to be newly defined because from Layer 2 protocol point of view, RLC functions and configurations are bearer-specific while MAC functions and configurations are not.

To support dual or multiple connectivities, various protocol architectures are studied, and one of potential architectures is shown in FIG. 15. In this architecture, PDCP entity for UeNodeB is located in different network nodes, i.e. PDCP in CeNodeB.

As shown in FIG. 20, CeNodeB includes a PHY layer, a MAC layer, an RLC layer, a PDCH layer and an RRC layer while the UeNodeB includes a PHY layer, a MAC layer and an RLC layer. It is noted that the RRC layer and the PDCP layer exist only in the CeNodeB. In other words, there is the common RRC and PDCP layer and there is a set of RLC, MAC and PHY layers per connectivity. Accordingly, data on SRBs is signaled on CeNodeB and data on DRBs is signaled on either CeNodeB or UeNodeB according to the DRB configurations. That is, the CeNodeB can deliver data on DRBs in addition to control data on SRBs, while the UeNodeB can deliver data on only DRBs.

Here, the followings are considered:

CeNodeB and UeNodeB can be different nodes.

Transfer of data on SRBs is performed on CeNodeB.

Transfer of data on DRBs is performed on either CeNodeB or UeNodeB. Whether path of data on DRBs is on CeNodeB or UeNodeB can be configured by the eNodeB, MME, or S-GW.

There is X3 interface between CeNodeB and UeNodeB that is similar to conventional X2 interface between eNodeBs.

Because RRC connection reconfiguration is managed in the CeNodeB, the CeNodeB sends information about DRB configurations to UeNodeB via X3 interface.

FIG. 21 shows radio protocols of UE for supporting dual connectivities.

As shown in FIG. 21, the UeNodeB is responsible for transmitting best effort (BE) DRB. The CeNodeB is responsible for transmitting SRB and DRB. As above explained, PDCP entity for UeNodeB is located in CeNodeB.

As shown in FIG. 21, on the UE 100 side, there are plural MAC entities for macro cell of CeNodeB and small cells of UeNodeB. In other word, the UE 100 setups each MAC entity for each connectivity. Accordingly, the UE 100 includes plural MAC entities for dual or multiple connectivities. Here, although FIG. 21 illustrates two PHY entities for dual connectivities, only one PHY entity may handle dual connectivities. For the connectivity to UeNodeB, the UE 100 may include the PDCP entity, the RLC entity and the MAC entity which handle BE-DRB. For connectivity to CeNodeB, the UE 100 may include plural RLC entities, plural PDCP entities which handle SRB and DRB.

Meanwhile, each of the CeNodeB and the UeNodeB owns a radio resource for itself and include a scheduler for scheduling the radio resource for itself. Here, each scheduler and each connectivity are 1-to-1 mapping.

As such, because each scheduler schedules own radio resources, each scheduler needs to know the amount of data to schedule.

However, existing BSR mechanism only allows the UE to report the amount of data per logical cannel group (LCG) in one message to one eNodeB. It implies that the information about buffer status would need to be exchanged between the eNodeBs that are subject to dual connectivity. So, there would be a delay for the eNodeB to schedule.

Therefore, the present disclosure provides a solution that the UE can trigger each buffer status report corresponding to each connectivity, if the uplink data becomes available to be transmitted.

For the solution, the present disclosure provides one example technique. According to the technique, if the UE having connectivity to a plurality of cells receives configurations on a plurality of bearers with the plurality of cells, then the UE sets up the plurality of bearers related to connectivity to the plurality of cells based on the received configurations. Afterward, if an uplink data becomes available to be transmitted on a radio bearer, the UE identifies a connectivity corresponding to the radio bearer on which the uplink data becomes available and then triggers a buffer status report including information on the uplink data on the radio bearer thereby to transmit the buffer status report via the identified connectivity.

FIG. 22 shows one exemplary method according to one embodiment of the present disclosure.

Referring to FIG. 22, it is illustrated how BSR triggering and reporting are performed in dual connectivity.

(1) In detail, the UE 100 may receive a configuration on dual connectivities to CeNodeB (or Macro eNodeB) 200 and UeNodeB (or small eNodeB) 300. The configuration may indicate that a first connectivity (connectivity 1) is for CeNodeB and a second connected (connectivity 2) is for UeNodeB. Then, the UE 100 may activate (or configure) each MAC entity for each connectivity.

(2) And, the UE 100 may receive configuration on a plurality of bearers. The configuration may indicate that a first radio bearer (radio bearer 1) is related to or associated with the first connectivity (connectivity 1) and a second radio bearer (radio bearer 2) is related to or associated with the second connectivity (connectivity 2). Then, the UE 100 may associate (or correlate) each MAC entity for each connectivity with each radio bearer.

(3) Afterward, the UE 100 may detect an arrival of an uplink data from the first radio bearer (radio bearer 1). In other word, the UE 100 may check whether the uplink data becomes available to be transmitted and then identify a corresponding MAC entity, i.e., the first MAC entity on which the uplink data is to be transmitted among the first and second MAC entities. And, the UE 100 may trigger a buffer status report (BSR) for the first MAC entity. Here, if the UE 100 does not have any UL grant for the first MAC entity, i.e., the first connectivity (connectivity 1), it triggers Scheduling Request for the first connectivity (connectivity 1) by using PUCCH or RA procedure.

(4) Thereafter, the UE may transmit the BSR including information on data of the first MAC entity, i.e., the first radio bearer (radio bearer 1)

(5) Also, the UE 100 may detect an arrival of an uplink data from the second radio bearer (radio bearer 2). In other word, the UE 100 may check whether the uplink data becomes available to be transmitted and then identify a corresponding MAC entity, i.e., the second MAC entity on which the uplink data is to be transmitted among the first and second MAC entities. And, the UE 100 may trigger a buffer status report (BSR) for the second MAC entity. Here, if the UE 100 does not have any UL grant for the second MAC entity, i.e., the second connectivity (connectivity 2), it triggers Scheduling Request for the second connectivity (connectivity 2) by using PUCCH or RA procedure.

(6) Thereafter, the UE may transmit the BSR including information on data of the second MAC entity, i.e., the second radio bearer (radio bearer 2).

As such, according to the one embodiment, the UE can trigger each buffer status report corresponding to each connectivity, if the uplink data becomes available to be transmitted. Therefore, the one embodiment may reduce a delay time required to exchange the BSR between eNodeBs in the existing BSR mechanism.

Hereinafter, other embodiments of the present disclosure will be explained

<Connectivity Grouping>

For realizing dual connectivity, from UE point of view, one MAC layer is needed for each eNodeB assuming that there is one connectivity per eNodeB. Because one eNodeB serves one or more cells and cells belonging to the same eNodeB can be handed in one MAC layer, the UE has one MAC layer per connectivity. For dual connectivity, it is assumed that the UE has at least one connectivity for macro cell(s) and one or more connectivity for small cells. For example, the UE is served by one macro cell and two small cells. Those small cells are served by different UeNodeBs. Then, the UE has 3 connectivity that requires 3 MAC layers.

The connectivity management can be done by CeNodeB, MME or S-GW. The following is included in the connectivity management.

Connectivity identifier (Id)

The UE can be configured with connectivity Id for each connectivity by e.g., RRC messages. For example, the UE can be configured with connectivity Id 0 for CeNodeB, connectivity Id 1 for UeNodeB1, and connectivity Id 2 for UeNodeB2. The connectivity Id is generally used for identification of connectivity between the UE and eNodeB, e.g., when the connectivity is added, modified or removed.

Configuration per connectivity

With connectivity grouping, the common configuration for cells belonging to the same connectivity can be provided to the UE. For example, if the configurations are provided with the connectivity Id, the UE applies the configurations to the cells belonging to the connectivity indicated by the connectivity Id.

Default configuration for connectivity

Configurations for the connectivity for CeNodeB are considered as fault configuration. So, if the connectivity is removed, default configuration is applied to the configuration including radio bearer configured for the removed connectivity. For example, the UE is configured with radio bearers A and B and radio bearer A is configured for CeNodeB (connectivity 1) and radio bearer B is configured for UeNodeB (connectivity 2). If the connectivity 2 is removed, the UE considers the radio bearer B to be configured for connectivity 1.

Connectivity timer

The UE can be configured with connectivity timer for each connectivity. When the UE is configured with a new connectivity, the UE starts the connectivity timer for the new connectivity. The UE re-starts the connectivity timer if the connectivity is modified. If the connectivity timer expires, the UE releases the connectivity.

Activation/deactivation of the connectivity

The eNodeB (e.g., CeNodeB) may order the UE to activate or deactivate one, some, all connectivity. When a new connectivity is added to the UE, the UE consider the connectivity to be deactivated. When the eNodeB asks the UE to activate the connectivity by PDCCH, MAC, RLC, PDCP, RRC signaling, the UE activates the connectivity. For the activated connectivity, the UE can use the data transfer on it. If the eNodeB asks the UE to deactivate the connectivity, then, the UE deactivates the connectivity. For the deactivated connectivity, the UE cannot use the data transfer on it.

<Buffer Status Reporting (BSR)>

Because the scheduler in each eNodeB schedules own radio resources, each scheduler needs to know the amount of data to schedule.

However, existing BSR mechanism only allows the UE to report the amount of data per logical cannel group (LCG) in one message to one eNodeB. It implies that the information about buffer status would need to be exchanged between the eNodeBs that are subject to dual connectivity. So, there would be a delay for the eNodeB to schedule.

Therefore, it is proposed that the BSR procedure is performed per connectivity. That is, radio bearers configured for a connectivity are considered for the BSR procedure for the connectivity. For example, it is assumed that the UE has 2 connectivity (connectivity 1 and 2) and 2 sets of radio bearers (set A and B). It is further assumed that set A is used for connectivity 1 and set B is used for connectivity 2. In this case, the BSR procedure for connectivity 1 is associated with the data on radio bearers in set A and the BSR procedure for connectivity 2 is associated with the data on radio bearers in set B. So, If data on radio bears in set A arrives, The UE triggers the BSR for the connectivity 1. It means that the UE reports the BSR (i.e., BSR MAC CE) to the eNodeB which is subject to the connectivity 1. Also, if the UE does not have UL resources, then the UE triggers SR for the connectivity 1. It means that the UE sends SR on PUCCH or performs the Random Access procedure to/on the eNodeB which is subject to the connectivity 1. The BSR MAC CE includes information only about buffer status of radio bearers in set A.

If data on radio bears in set B arrives,

The UE triggers the BSR for the connectivity 2. It means that the UE reports the BSR (i.e., BSR MAC CE) to the eNodeB which is subject to the connectivity 2. Also, if the UE does not have UL resources, then the UE triggers SR for the connectivity 2. It means that the UE sends SR on PUCCH or performs the Random Access procedure to/on the eNodeB which is subject to the connectivity 2. The BSR MAC CE includes information only about buffer status of radio bearers in set B.

Also, BSR configurations including periodicBSR-Timer, retxBSR-Timer and so on can be configured per connectivity. In addition to BSR configurations, those timers operate on each connectivity.

eNodeB may want to know total amount of UE's data (in UL). In this case, eNodeB can order the UE to report the total amount of data in UL. This order can be signaled by the PDCCH, MAC, RLC, PDCP, or RRC signaling. Also, eNodeB can configure the UE with periodic timer for reporting total amount of data in UL. The total amount of data can be indicated by amount of data per LCG, amount data per logical channel, amount of data per connectivity or etc.

Also, the UE can report the amount of data for connectivity if the connectivity is added, removed or modified. It means that the UE triggers the BSR when the connectivity is added, removed or modified. In those cases, the UE sends the BSR to eNodeBs for which the configured radio bears are changed. For example, the UE has two radio bears (A and B) for connectivity 1. If the UE is configured with a new connectivity 2 and radio bearer B is configured for connectivity 2, then the UE triggers the BSR for connectivity 2 and sends the BSR to the eNodeB which is subject to the connectivity 2, including the amount of data on radio bear B.

Also, the UE triggers the BSR for connectivity 1 and sends it to the eNodeB which is subject to the connectivity 1, including the amount of data on radio bears on radio bear A.

If the connectivity is removed, the UE triggers the BSR and sends it to the CeNodeB (or other UeNodeBs) to indicate the amount of data for radio bears configured for the removed connectivity.

When the amount of data on radio bears configured for connectivity is indicated, the connectivity id can be indicated together to identify the connectivity. For example, when the UE report BSR for connectivity 1, then the UE also indicates connectivity id assigned for connectivity 1 along with the BSR.

<Logical Channel Prioritization (LCP)>

When the UE receives the UL grant from the eNodeB which is subject to certain connectivity, during the LCP procedure, the data on radio bearers configured and/or control information for the connectivity is only considered. For example, if the UE has 2 connectivity (A and B) and radio bearer "a" is configured for connectivity A and radio bearer "b" is configured for connectivity B, when the UE receives the UL grant from the eNodeB which is subject to the connectivity A, then the data on radio bearer "a" is considered for generating the MAC PDU by the received UL grant. I.e., in LCP procedure, the UL grant is only applicable to the data on radio bearers configured for connectivity for which the UL grant is assigned.

<Power Headroom Reporting (PHR)>

The PHR configurations per connectivity can be provided to the UE. Also, PHR related timers can operate per connectivity.

If the UE triggers PHR, it sends the PHR MAC CE. The PHR MAC CE includes the PH of cells belonging to the same connectivity.

When the connectivity is added, removed, or modified, the UE triggers the PHR for one, some, or all the configured connectivity.

When the UE reports the PHs for connectivity, the UE can indicate the connectivity Id.

<Maintenance of Uplink Timing Alignment>

Configuration about uplink timing alignment per connectivity can be provided to the UE. Uplink timing alignment related timer (e.g., timeAlignmentTimer) can operate per connectivity.

When the timeAlignmentTimer for connectivity for CeNodeB expires, the UE considers timeAlignmentTimer for all connectivity as expired.

When the Timing Advance Command is indicated, the connectivity Id is also indicated. Then, the UE applies the Timing Advance Command for the connectivity indicated by the connectivity Id and starts the timeAlignmentTimer for the connectivity indicated by the connectivity Id <Random Access Procedure>

The Random Access procedure is also performed per connectivity. If the Random Access procedure needs to be performed at the same time on 2 or more connectivity, the UE prioritizes the Random Access procedure on the connectivity of the CeNodeB over connectivity of the UeNodeBs.

The ways or methods to solve the problem of the related art according to the present disclosure, as described so far, can be implemented by hardware or software, or any combination thereof.

FIG. 23 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB (including CeNodeB and UeNodeB) 200/300 includes a processor 201/301, memory 202/302, and an RF unit 203/303. The memory 202/302 is connected to the processor 201/301 and configured to store various information used for the operations for the processor 201/301. The RF unit 203/303 is connected to the processor 201/301 and configured to send and/or receive a radio signal. The processor 201/301 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for providing a buffer status report in a mobile communication system, the method comprising:
    configuring, by a user equipment (UE), a first medium access control (MAC) entity associated with a first base station;
    configuring, by the UE, a second MAC entity associated with a second base station, wherein the first base station and the second base station are different nodes from each other;
    triggering, by the first MAC entity of the UE, a first buffer status report if first data is available in an uplink associated with the first MAC entity; and
    triggering, by the second MAC entity of the UE, a second buffer status report if second data is available in an uplink associated with the second MAC entity,
    wherein the UE establishes a radio resource control (RRC) connection with only the first base station, and wherein the first base station and the second base station have different timing alignment configurations.

2. The method of claim 1, wherein:
the first buffer status report includes information on the first data in the first MAC entity, and
the second buffer status report includes information on the second data in the second MAC entity.

3. The method of claim 1, wherein:
the first buffer status report includes information on an amount of the first data in a first logical channel group (LCG), and
the second buffer status report includes information on an amount of the second data in a second LCG.

4. The method of claim 1, further comprising:
receiving configurations associated with the first and second buffer status reports,
wherein each of the configurations includes a periodicBSR-Timer indicating a periodic timing of the corresponding first or second buffer status report and a retxBSR-Timer indicating a retransmission timing of the corresponding first or second buffer status report.

5. The method of claim 4, wherein the receiving of the configurations includes:
receiving a first configuration associated with the first buffer status report; and
receiving a second configuration associated with the second buffer status report.

6. The method of claim 1, further comprising:
performing a first random access procedure associated with the first MAC entity; and
performing a second random access procedure associated with the second MAC entity.

7. The method of claim 1, wherein:
if the first base station provides a first plurality of cells, the first MAC entity handles the first plurality of cells of the first base station; and
if the second base station provides a second plurality of cells, the second MAC entity handles the second plurality of cells of the second base station.

8. A user equipment (UE) in a mobile communication system, the UE comprising:
a radio frequency (RF) unit; and
a processor operatively connected with the RF unit, thereby to control to:
configure a first medium access control (MAC) entity associated with a first base station, and
configure a second MAC entity associated with a second base station,
wherein the first base station and the second base station are different nodes from each other,
wherein the first MAC entity triggers a first buffer status report if first data is available in an uplink associated with the first MAC entity,
wherein the second MAC entity triggers a second buffer status report if second data is available in an uplink associated with the second MAC entity,
wherein the UE establishes a radio resource control (RRC) connection with only the first base station, and
wherein the first base station and the second base station have different timing alignment configurations.

9. The UE of claim 8, wherein:
the first buffer status report includes information on the first data in the first MAC entity, and
the second buffer status report includes information on the second data in the second MAC entity.

10. The UE of claim 8, wherein:
the first buffer status report includes information on an amount of the first data in a first logical channel group (LCG), and
the second buffer status report includes information on an amount of the second data in a second LCG.

11. The UE of claim 8, wherein the RF unit is further configured to receive configurations associated with the first and second buffer status reports, and
wherein each of the configurations includes a periodicBSR-Timer indicating a periodic timing of the corresponding first or second buffer status report and a retxBSR-Timer indicating a retransmission timing of the corresponding first or second buffer status report.

12. The UE of claim 11, wherein the RF unit is configured to:
receive a first configuration associated with the first buffer status report; and
receive a second configuration associated with the second buffer status report.

13. The UE of claim 8, wherein the processor is further configured to:
perform a first random access procedure associated with the first MAC entity; and
perform a second random access procedure associated with the second MAC entity.

14. The UE of claim 8, wherein:
if the first base station provides a first plurality of cells, the first MAC entity handles the first plurality of cells of the first base station; and
if the second base station provides a second plurality of cells, the second MAC entity handles the second plurality of cells of the second base station.

15. The method of claim 1, further comprising:
running, by the first MAC entity of the UE, a first time alignment timer for an uplink timing with the first base station; and
running, by the second MAC entity of the UE, a second time alignment timer for an uplink timing with the second base station,
wherein when the first time alignment timer associated with the first base station expires, the second time alignment timer associated with the second base station is considered to be expired.

* * * * *